(12) United States Patent
Ikehara et al.

(10) Patent No.: US 9,831,950 B2
(45) Date of Patent: Nov. 28, 2017

(54) VISIBLE LIGHT COMMUNICATION RECEIVER, MOBILE OBJECT, AND VISIBLE LIGHT COMMUNICATION SYSTEM

(71) Applicant: Panasonic Intellectual Property Management Co., Ltd., Osaka (JP)

(72) Inventors: Masaaki Ikehara, Osaka (JP); Yoshihiko Matsukawa, Nara (JP); Masahito Ohnishi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/251,786

(22) Filed: Aug. 30, 2016

(65) Prior Publication Data

US 2017/0070288 A1 Mar. 9, 2017

(30) Foreign Application Priority Data

Sep. 3, 2015 (JP) ................ 2015-174132

(51) Int. Cl.
*H04B 10/00* (2013.01)
*H04B 10/116* (2013.01)
*H04B 10/60* (2013.01)
*H04B 10/50* (2013.01)

(52) U.S. Cl.
CPC ......... *H04B 10/116* (2013.01); *H04B 10/501* (2013.01); *H04B 10/60* (2013.01)

(58) Field of Classification Search
CPC . H04B 10/116; H04B 10/112; H04B 10/1141; H04B 10/1143; H04B 10/1149; H04B 10/60; H04B 10/501; H05B 33/0842; H05B 37/0272

USPC ....... 398/172, 128, 130, 131, 127, 118, 119, 398/202, 135, 136, 115; 315/312, 307, 315/291, 294, 293

See application file for complete search history.

(56) References Cited

U.S. PATENT DOCUMENTS

| 6,865,347 B2 * | 3/2005 | Perkins ..................... G01S 1/70 398/130 |
| 2013/0142518 A1 * | 6/2013 | Sheu .................... H04B 10/807 398/130 |
| 2015/0078741 A1 * | 3/2015 | O'Connor ............ H04B 10/116 398/23 |

FOREIGN PATENT DOCUMENTS

| JP | 10-214546 A | 8/1998 |
| JP | 2005-039745 A | 2/2005 |
| JP | 2010-151448 A | 7/2010 |
| JP | 2011-040353 A | 2/2011 |
| JP | 2012-142204 A | 7/2012 |

* cited by examiner

*Primary Examiner* — Hanh Phan
(74) *Attorney, Agent, or Firm* — McDermott Will & Emery LLP

(57) ABSTRACT

A visible light communication receiver to be attached to a mobile object includes: a light receiving device which receives a light signal for visible light communication, the light signal including predetermined information; and a lens component disposed over the light receiving device. The lens component has a first directional angle on a first plane and a second directional angle on a second plane orthogonal to the first plane. The first directional angle is narrower than the second directional angle.

14 Claims, 14 Drawing Sheets

WHEN TURNING LEFT

VISIBLE LIGHT COMMUNICATION RECEIVER, MOBILE OBJECT, AND VISIBLE LIGHT COMMUNICATION SYSTEM

CROSS REFERENCE TO RELATED APPLICATION

This application claims the benefit of priority of Japanese Patent Application Number 2015-174132 filed on Sep. 3, 2015, the entire content of which is hereby incorporated by reference.

BACKGROUND

1. Technical Field

The present disclosure relates to a visible light communication receiver, a mobile object, and a visible light communication system which use visible light communication.

2. Description of the Related Art

A conventional technique of incorporating functions of visible light communication into a light emitting diode (LED) lamp for tunnel illumination is known (for example, see Patent Literature 1 (PTL 1): Japanese Unexamined Patent Application Publication No. 2011-40353). PTL 1 discloses that through visible light communication, information superimposed on illumination light is received and transmitted by a visible light communication unit provided in a maintenance vehicle, so as to be used for maintenance of LED light fittings.

SUMMARY

For example, a tunnel has a plurality of tunnel illuminating lamps disposed at predetermined spacings. Therefore, especially when a vehicle travels at high speed, a period of time in which the vehicle passes by each reception area where a light signal from a corresponding one of the tunnel illuminating lamps can be properly received is short. This increases the impact of an interference area where light signals from adjacent tunnel illuminating lamps interfere, thus causing a problem that it is difficult to receive appropriate light signals.

In view of these circumstances, it is an object of the present disclosure to provide a visible light communication receiver, a mobile object, and a visible light communication system capable of reducing the impact of the interference area and receiving appropriate light signals.

In order to achieve the above object, a visible light communication receiver according to an aspect of the present disclosure is a visible light communication receiver to be attached to a mobile object, and includes: a light receiving device which receives a light signal for visible light communication, the light signal including predetermined information; and a lens component disposed over the light receiving device, wherein the lens component has a first directional angle on a first plane and a second directional angle on a second plane orthogonal to the first plane, the first directional angle being narrower than the second directional angle.

A mobile object according to an aspect of the present disclosure includes the visible light communication receiver described above.

A visible light communication system according to an aspect of the present disclosure includes: the visible light communication receiver described above; and a visible light communication transmitter which transmits the light signal for visible light communication.

With a visible light communication receiver and so forth according to the present disclosure, it is possible to reduce the impact of the interference area and receive appropriate light signals.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Figure 1:
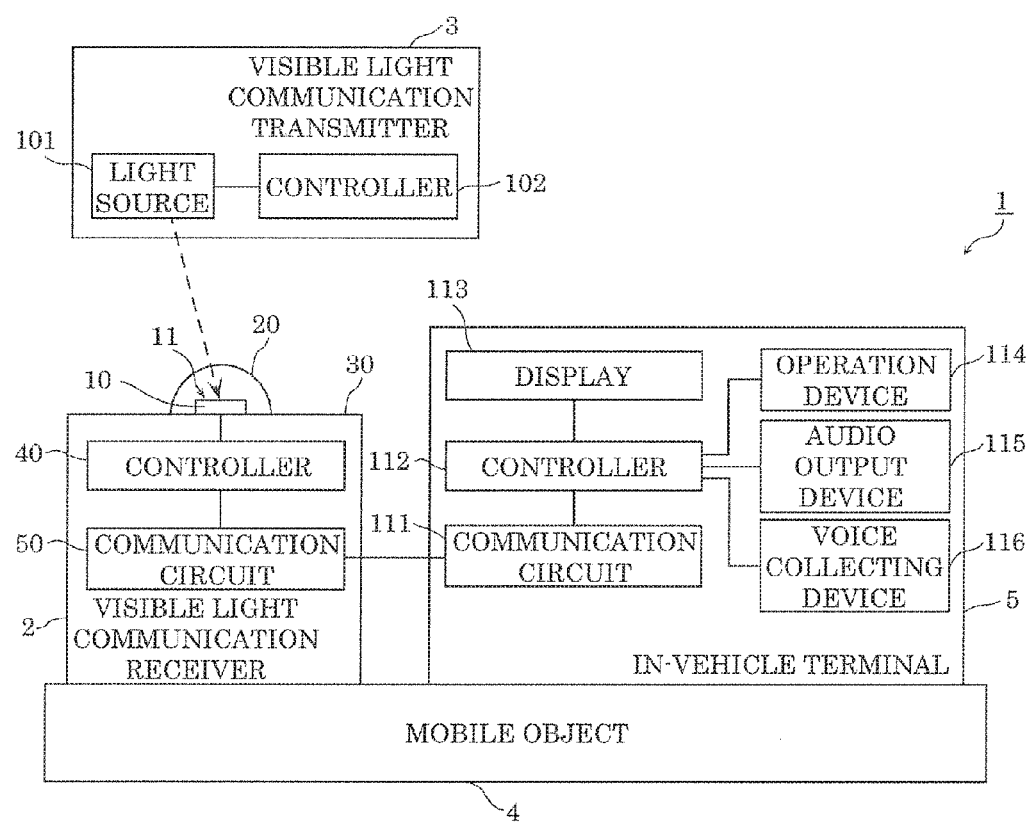
FIG. 1 is a block diagram illustrating the configuration of a visible light communication system according to Embodiment 1.

Hereinafter, a visible light communication receiver, a mobile object, and a visible light communication system according to embodiments of the present disclosure will be described in detail by reference to the drawings. It is to be noted that each of the embodiments described below is to show a preferable specific example of the present disclosure. Therefore, the numerical values, shapes, materials, structural elements, the arrangement and connection of the structural elements, steps, and the processing order of the steps etc., shown in the following embodiments are more examples, and are therefore not intended to limit the subject matter of the present disclosure.

It is to be noted that each drawing is a schematic diagram and is not necessarily a precise illustration. Furthermore, in the drawings, like reference signs are given to like structural components. In addition, the following embodiments are described using expressions including the word "substantially" or "approximate" as in "substantially parallel." For example, "substantially parallel" means not only perfectly parallel but also substantially parallel, that is, including the margin of error on the order of several percentages, for example. The same holds true for the other expressions including "substantially" or "approximate."

Embodiment 1

Outline of Visible Light Communication System

First, an outline of the visible light communication system according to the present embodiment will be described by reference to FIG. 1. FIG. 1 is a block diagram illustrating the configuration of visible light communication system 1 according to the present embodiment.

As illustrated in FIG. 1, visible light communication system 1 includes visible light communication receiver 2 and visible light communication transmitter 3. Visible light communication receiver 2 is attached to mobile object 4. In the present embodiment, visible light communication system 1 further includes in-vehicle terminal 5.

Visible light communication receiver 2 is a receiver which receives a light signal for visible light communication. Visible light communication receiver 2 is attached to mobile object 4 to move with mobile object 4.

Visible light communication transmitter 3 is a transmitter which transmits a light signal for visible light communication. Visible light communication transmitter 3 is specifically an illumination apparatus which emits illumination light (visible light) having predetermined information superimposed thereon. In the present embodiment, visible light communication transmitter 3 is disposed above mobile object 4. Specifically, visible light communication transmitter 3 is either one of a tunnel illuminating lamp and a street light.

For example, a plurality of visible light communication transmitters 3 are disposed on an inner wall of a tunnel at predetermined spacings. Each of the plurality of visible light communication transmitters 3 transmits different information (such as unique identification information), for example. Alternatively, the plurality of visible light communication transmitters 3 may transmit common information such as environmental information based on the environment in which visible light communication transmitters 3 are disposed.

The environmental information is congestion information, accident information, and/or weather information, for example. The congestion information is information indicating a congestion situation inside the tunnel or in the vicinity of the exit of the tunnel, for example. The accident information is information indicating whether or not there has been an accident inside the tunnel or in the vicinity of the exit of the tunnel, for example. The weather information is information indicating the road surface condition inside the tunnel or the weather at the exit of the tunnel.

Mobile object 4 is an object which moves and is specifically a vehicle which moves (travels) according to a user (driver) operation. Alternatively, mobile object 4 may be a motorcycle or a train, for example, or may be an autonomous vehicle which travels without a user operation.

In-vehicle terminal 5 is provided in mobile object 4 and is connected with visible light communication receiver 2. In-vehicle terminal 5 notifies the driver of mobile object 4 of information included in the light signal which visible light communication receiver 2 has received.

Hereinafter, each of structural elements included in visible light communication system 1 will be described in detail.

Visible Light Communication Receiver

Figure 2:
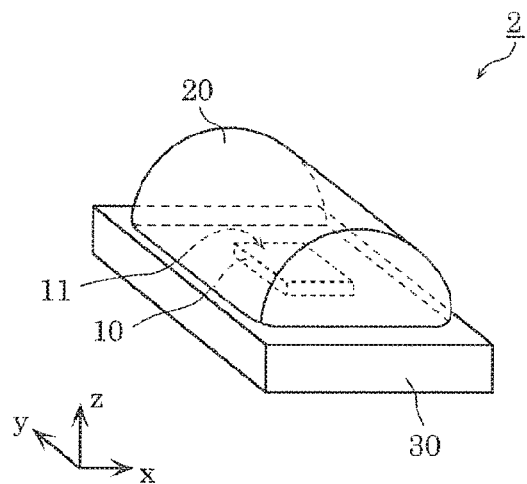
FIG. 2 is a perspective bird's eye view of a visible light communication receiver according to Embodiment 1.
Figure 3:
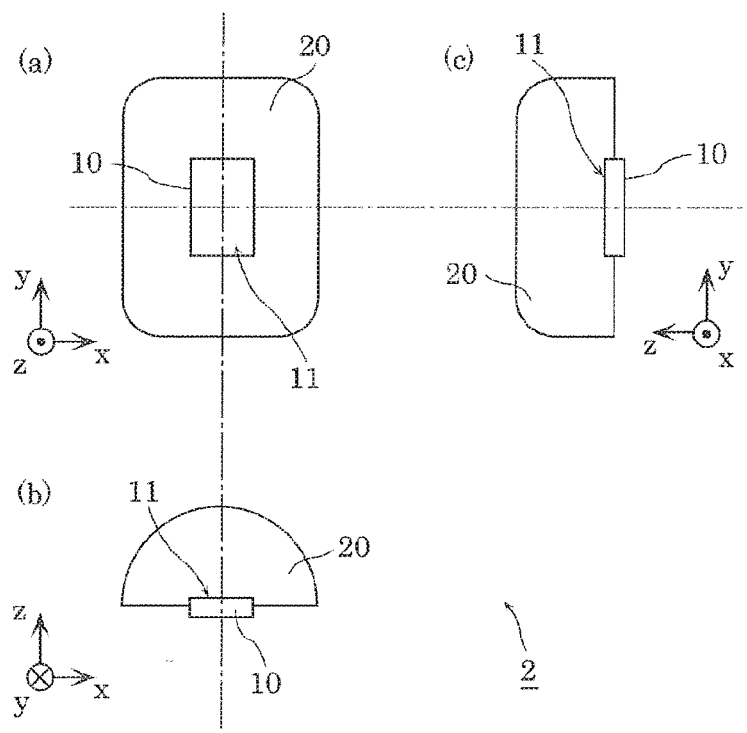
FIG. 3 illustrates three orthogonal views of a visible light communication receiver according to Embodiment 1.

FIG. 2 illustrates a perspective bird's eye view of visible light communication receiver 2 according to the present embodiment, and FIG. 3 illustrates three orthogonal views of visible light communication receiver 2 according to the present embodiment. Specifically, (a), (b), and (c) of FIG. 3 are a plan view (top view), a front view, and a side view (right side view) of visible light communication receiver 2, respectively. It is to be noted that housing 30 is not illustrated in FIG. 3 to facilitate understanding of the positional relationship between light receiving device 10 and lens component 20 of visible light communication receiver 2 and the shape of lens component 20.

It is to be noted that in each drawing, the z-axis direction is the direction orthogonal to light receiving surface 11 of light receiving device 10, and the x-axis direction and the y-axis direction are two directions orthogonal to each other on light receiving surface 11.

As illustrated in FIG. 2, visible light communication receiver 2 includes light receiving device 10, lens component 20, and housing 30. As illustrated in FIG. 1, visible light communication receiver 2 further includes controller 40 and communication circuit 50. Hereinafter, each structural element of visible light communication receiver 2 will be described in detail.

Light receiving device 10 receives a light signal for visible light communication, and the light signal includes predetermined information. The light signal is specifically visible light having a peak wavelength in a range from 380 nm to 780 nm and is illumination light on which predetermined information is superimposed. The illumination light is white light, for example, but is not limited to white light in particular, and may be colored light such as orange light or red light. Light receiving device 10 is a device capable of receiving visible light and generating an electric signal, such as a photodiode or a phototransistor.

In the present embodiment, light receiving device 10 has a rectangular shape in plan view as illustrated in (a) of FIG. 3. It is to be noted that the plan view is a view when light receiving device 10 is seen from the positive side of the z-axis direction, and is a view when light receiving device 10 is seen with light receiving surface 11 at the front. In the present embodiment, light receiving surface 11 of light receiving device 10 in plan view has a rectangular shape having shorter sides parallel to the x-axis direction and longer sides parallel to the y-axis direction.

Lens component 20 is disposed over light receiving device 10. Lens component 20 has a first directional angle on a first plane and a second directional angle on a second plane orthogonal to the first plane. The first directional angle is narrower than the second directional angle. The first plane and the second plane are virtual planes. In the present embodiment, the first plane refers to the xz plane and the second plane refers to the yz plane.

Figure 4:
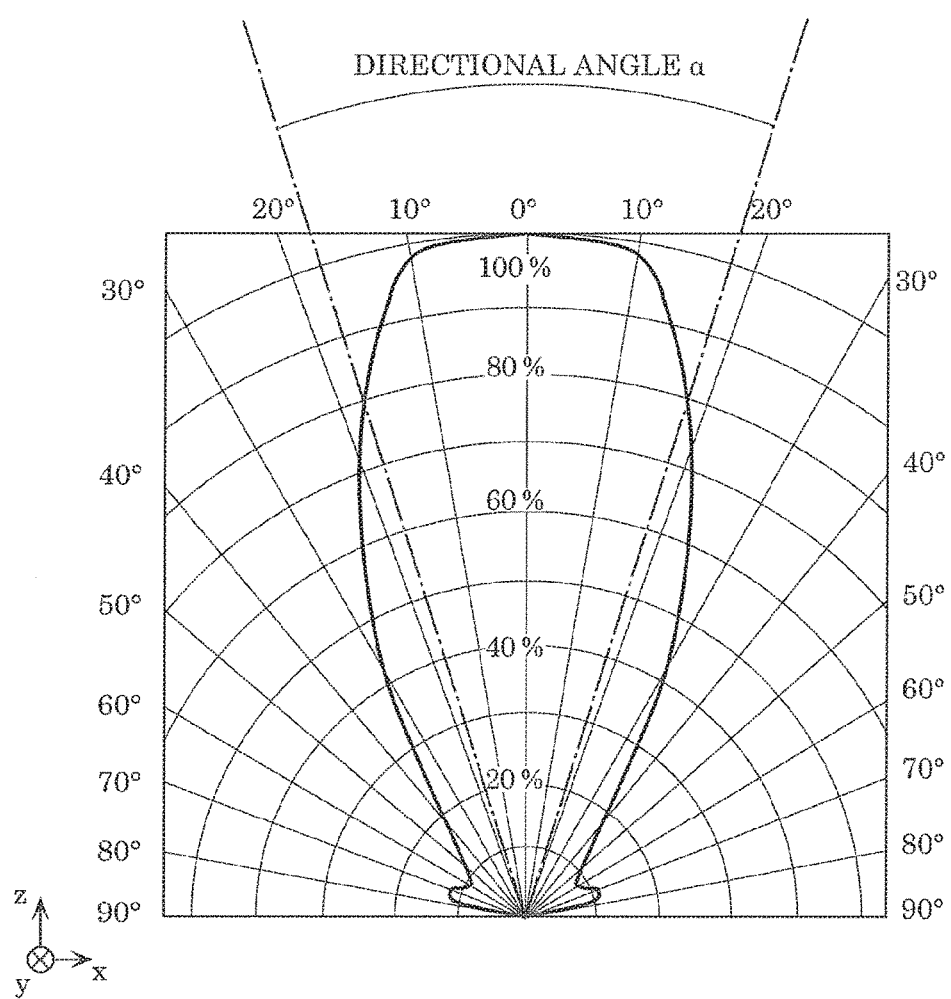
FIG. 4 is a diagram illustrating directional characteristics of a lens component on a first plane according to Embodiment 1.
Figure 5:
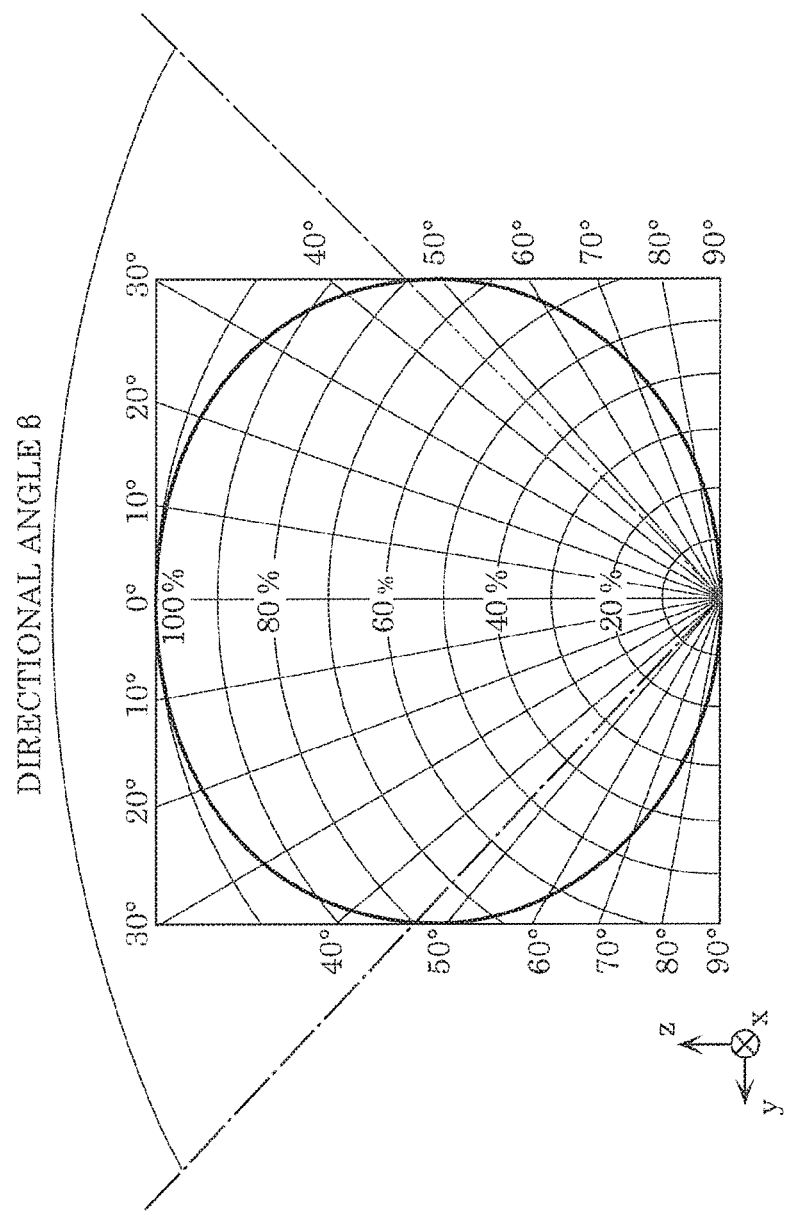
FIG. 5 is a diagram illustrating directional characteristics of a lens component on a second plane according to Embodiment 1.

FIG. 4 is a diagram illustrating directional characteristics of lens component 20 on the first plane (xz plane) according to the present embodiment. FIG. 5 is a diagram illustrating directional characteristics of lens component 20 on the second plane (yz plane) according to the present embodiment.

Each directional angle represents an angle of visible light which light receiving device 10 is capable of receiving. In the diagram illustrating the directional characteristics on the xz plane, directional angle α (first directional angle) on the xz plane indicates a range in which the reception intensity is greater than or equal to a predetermined value (80%, for example). In the present embodiment, directional angle α is ±17 degrees as illustrated in FIG. 4.

Similarly, in the diagram illustrating the directional characteristics on the yz plane, directional angle β (second directional angle) on the yz plane indicates a range in which the reception intensity is greater than or equal to a predetermined value (80%, for example). In the present embodiment, directional angle β is ±46 degrees as illustrated in FIG. 5.

It is to be noted that the above-described predetermined values are determined according to the reception performance of light receiving device 10, for example.

It is to be noted that in the present embodiment, lens component 20 has a narrow directional angle not only on the xz plane but also on the plane orthogonal to the yz plane (that is, the plane parallel to the x-axis direction) as in FIG. 4. Similarly, lens component 20 has a wide directional angle not only on the yz plane but also on the plane orthogonal to the xz plane (that is, the plane parallel to the y-axis direction) as in FIG. 5. That is to say, the directional characteristics of lens component 20 have a shape formed by combining FIG. 4 and FIG. 5, that is, a shape which has a predetermined thickness in the x-axis direction and is flat on the yz plane.

Hereinafter, the shape of lens component 20 for achieving the directional characteristics illustrated in FIG. 4 and FIG. 5 will be described.

In the present embodiment, lens component 20 has a substantially semicircular cylindrical shape as illustrated in FIG. 2. Lens component 20 is disposed in a manner that the axis direction of the semicircular cylinder coincides with the y-axis direction. Lens component 20 is disposed in a manner that the axis direction (the y-axis direction) coincides with the longitudinal direction of light receiving surface 11 of light receiving device 10. In other words, the longitudinal direction of lens component 20 matches the longitudinal direction of light receiving device 10.

Specifically, when viewed in the direction parallel to the first plane and the second plane (yz plane), lens component 20 has a substantially rectangular shape elongated in the normal direction (the y-axis direction) of the first plane (xz plane). Specifically, as illustrated in (a) of FIG. 3, lens component 20 in plan view has a substantially rectangular shape elongated in the y-axis direction. To be more specific, lens component 20 in plan view has a quadrangular shape having four round corners.

Lens component 20 in front view has a substantially semicircular shape or a substantially semielliptical shape as illustrated in (b) of FIG. 3. As illustrated in (c) of FIG. 3, lens component 20 in side view has a substantially rectangular shape elongated in the y-axis direction. It is to be noted that the shape of lens component 20 in side view has two round corners on the positive side of the z-axis direction.

Lens component 20 is formed from, for example, a light-transmissive resin material such as acrylic (polymethyl methacrylate (PMMA)) or polycarbonate (PC). For example, lens component 20 is formed by injection molding using a light-transmissive resin material.

It is to be noted that the positional relationship between light receiving device 10 and lens component 20 and the shape of lens component 20 are not particularly limited. Variations of the shape of lens component 20 will be described later.

Housing 30 is a support base which supports light receiving device 10 and lens component 20. Housing 30 houses a control circuit for extracting predetermined information from visible light (light signal) which light receiving device 10 has received. Housing 30 also functions as an attachment component for attaching visible light communication receiver 2 to mobile object 4.

Although housing 30 in the present embodiment has a flat, substantially rectangular parallelepiped shape as illustrated in FIG. 2, the shape of housing 30 is not particularly limited. Housing 30 is, for example, formed from a resin material such as polybutylene terephthalate (PBT).

Controller 40 is a controller which controls each structural element of visible light communication receiver 2. Controller 40 includes, for example, a nonvolatile memory in which a program is stored, a volatile memory which is a temporary storage area for running a program, an input/output port, and a processor which runs a program. Controller 40 is a microcontroller, for example.

Controller 40 is electrically connected to light receiving device 10 and extracts predetermined information from visible light (light signal) which light receiving device 10 has received. Specifically, controller 40 extracts the predetermined information by demodulating the light signal, and transmits the extracted information to the other apparatus via communication circuit 50. The other apparatus is specifically in-vehicle terminal 5 of mobile object 4 to which visible light communication receiver 2 is attached. Alternatively, the other apparatus may be an external server apparatus.

Communication circuit 50 is a communication interface which communicates with the other apparatus. Communication may be wired communication or wireless communication. In the present embodiment, as illustrated in FIG. 1, communication circuit 50 is connected to communication circuit 111 of in-vehicle terminal 5 via a wire such as a communication cable. Communication circuit 50 transmits to in-vehicle terminal 5 the predetermined information extracted by controller 40.

Visible Light Communication Transmitter

Next, visible light communication transmitter 3 will be described by reference to FIG. 1. As illustrated in FIG. 1, visible light communication transmitter 3 includes light source 101 and controller 102.

Light source 101 emits illumination light for visible light communication, and the light signal includes predetermined information. The predetermined information is a visible light identification (ID), for example, and is specifically information such as identification information unique to visible light communication transmitter 3 or position information indicating the position at which visible light communication transmitter 3 is disposed. The predetermined information may further include environmental information.

Light source 101 includes a plurality of light emitting diodes (LEDs) connected in series, for example. Light source 101 emits illumination light to repeatedly transmit predetermined information superimposed on the illumination light.

Controller 102 is a controller which controls light source 101. Controller 102 includes, for example, a nonvolatile memory in which a program is stored, a volatile memory which is a temporary storage area for running a program, an input/output port, and a processor which runs a program. Controller 102 is a microcontroller, for example.

In the present embodiment, controller 102 switches on and off at least one LED among the plurality of LEDs included in light source 101. This changes the amount of current flowing through the plurality of LEDs, bringing about variations of light and shade of the illumination light. By switching on and off at least one LED using predetermined information, controller 102 transmits the predetermined information in the form of variations of light and shade of the illumination light. That is to say, light source 101 emits a light signal for visible light communication, and the light signal includes predetermined information. The modulation method and so on used for visible light communication is specified in CP-1223 "visible light beacon system" of the Standard of Japan Electronics and Information Technology Industries Association (JEITA), for example. It is to be noted that the predetermined information is stored in, for example, a storage not illustrated.

In-Vehicle Terminal

Next, in-vehicle terminal 5 will be described by reference to FIG. 1. As illustrated in FIG. 1, in-vehicle terminal 5 includes communication circuit 111, controller 112, display 113, operation device 114, audio output device 115, and voice collecting device 116.

Communication circuit 111 is a communication interface which communicates with visible light communication receiver 2. In the present embodiment, communication circuit 111 is connected with communication circuit 50 of visible light communication receiver 2 via a wire such as a communication cable. Communication circuit 111 receives predetermined information (for example, a visible light ID) transmitted from visible light communication receiver 2.

It is to be noted that communication circuit 111 may perform wireless communication with an external server apparatus. For example, communication circuit 111 may transmit to the server apparatus the visible light ID received from visible light communication receiver 2 and obtain from the server apparatus position information corresponding to the visible light ID. The wireless communication is communication based on a wireless communication standard such as Wi-Fi or long term evolution (LTE).

Controller 112 is a controller which controls each structural element of in-vehicle terminal 5. Controller 112 includes, for example, a nonvolatile memory in which a program is stored, a volatile memory which is a temporary storage area for running a program, an input/output port, and a processor which runs a program. Controller 112 is a microcontroller, for example.

Controller 112 generates a predetermined image or audio data based on predetermined information received via communication circuit 111. For example, controller 112 identifies the current position of mobile object 4 based on the visible light ID and generates an image showing a map indicating the current position identified. Alternatively, controller 112 generates an image for notifying the driver of the condition of the surrounding environment based on the environmental information. For example, controller 112 generates an image or audio data including character information "Traffic is congested at the tunnel exit."

Display 113 shows the image generated by controller 112. For example, display 113 shows a map indicating the current position of mobile object 4 or character information such as congestion information. Display 113 is a liquid crystal display or a touch panel display, for example.

Operation device 114 is a user interface which receives an operation from the driver or a passenger of mobile object 4. Operation device 114 is a touch panel display or a physical button, for example.

Operation device 114 receives from the driver or a passenger an operation for setting whether or not the information obtained via visible light communication should be output, for example. The operation received by operation device 114 is processed by controller 112. For example, when operation device 114 has received an operation indicating "Output congestion information only", controller 112 determines whether or not the information received via communication circuit 111 is included in the congestion information, and causes display 113 or audio output device 115 to output the information received via communication circuit 111 only if the information received via communication circuit 111 is included in the congestion information.

Audio output device 115 outputs audio data generated by controller 112. For example, audio output device 115 outputs audio data such as congestion information. Audio output device 115 is a speaker, for example.

Voice collecting device 116 obtains, for example, a voice uttered by the driver or a passenger of mobile object 4. The obtained voice is analyzed by controller 112. For example, when the voice indicates a predetermined instruction, controller 112 performs processing based on the instruction. Voice collecting device 116 is a microphone, for example.

Attachment of Visible Light Communication Receiver

Hereinafter, attachment of visible light communication receiver 2 to mobile object 4 according to the present embodiment will be described by reference to FIG. 6 and FIG. 7.

Figure 6:
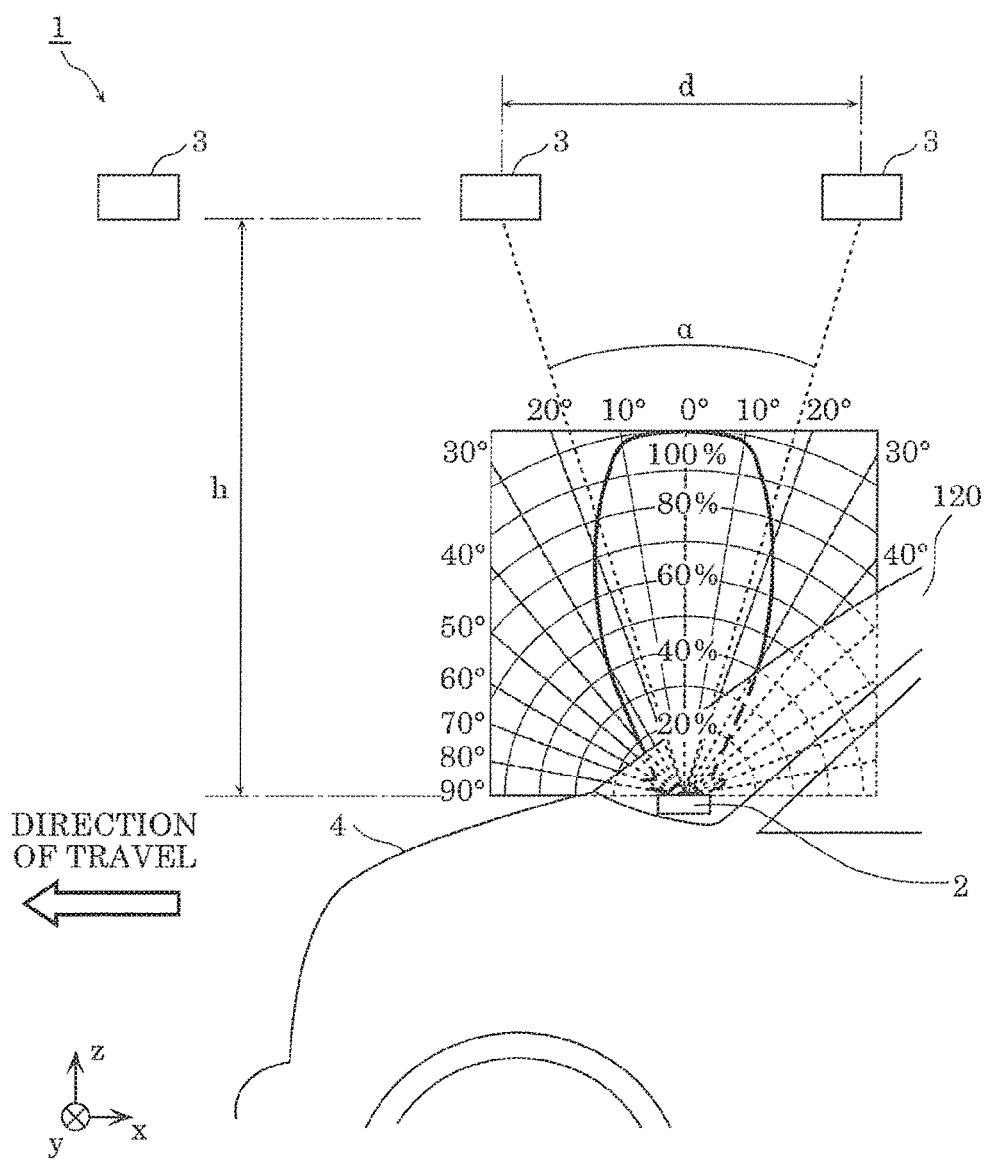
FIG. 6 is a diagram schematically illustrating the position of a visible light communication receiver and the directional characteristics of a lens component in a side view of a mobile object according to Embodiment 1.

FIG. 6 is a diagram schematically illustrating the position of visible light communication receiver 2 and the directional characteristics of lens component 20 in a side view of mobile object 4 according to the present embodiment. FIG. 7 is a diagram schematically illustrating the position of visible light communication receiver 2 and the directional characteristics of lens component 20 in a front view of mobile object 4 according to the present embodiment.

In the present embodiment, mobile object 4 is a car. Mobile object 4 is a sedan (saloon) car, for example, but may also be a truck or the like. Mobile object 4 includes window 120 which is light-transmissive. For example, window 120 is the front window into which a light-transmissive glass (windshield) is fitted. Window 120 has the property of transmitting visible light.

Visible light communication receiver 2 in the present embodiment is attached to the interior of mobile object 4. Specifically, as illustrated in FIG. 6 and FIG. 7, visible light communication receiver 2 is attached in the vicinity of window 120, and light receiving device 10 receives a light signal (illumination light) which enters via window 120. For example, visible light communication receiver 2 is attached on the dashboard or in the vicinity of the ceiling of the car to which the rearview mirror or a camera for an event data recorder is mounted. For example, visible light communication receiver 2 is attached by adhering the back surface of housing 30 (the surface opposite light receiving device 10) and the top surface of the dashboard, using an adhesive sheet, for example.

As illustrated in FIG. 6, visible light communication receiver 2 in the present embodiment is attached to mobile object 4 in a manner that the first plane (xz plane) is substantially parallel to the direction of travel of mobile object 4 (the negative side of the x-axis direction). Specifically, as illustrated in FIG. 7, visible light communication receiver 2 is attached to mobile object 4 in a manner that the second plane (yz plane) is substantially parallel to the direction (z-axis direction) orthogonal to the direction of travel of mobile object 4. That is to say, visible light communication receiver 2 is disposed in a manner that the directional angle in the front-back direction (direction of travel) of mobile object 4 is narrow whereas the directional angle in the vertical direction and the directional angle in the lateral direction of mobile object 4 are wide.

Directional Characteristics on the First Plane (in the Direction of Travel)

As illustrated in FIG. 6, directional angle α on the plane (e.g., the xz plane) parallel to the direction of travel of mobile object 4 (the negative side of the x-axis direction) is narrow, and thus when a plurality of visible light communication transmitters 3 are disposed in the direction of travel, it is possible to reduce the impact of the interference area of the light signals emitted by each of the plurality of visible light communication transmitters 3. It is to be noted that the interference area is a range in which a plurality of light signals from the plurality of visible light communication transmitters 3 are received. The following describes a condition to be satisfied by directional angle α on the plane parallel to the direction of travel in order to reduce the impact of the interference area of the light signals.

In the case of receiving a light signal from only one visible light communication transmitter 3, visible light communication receiver 2 can demodulate the light signal and extract information superimposed on the light signal. In the case of receiving a plurality of light signals from a plurality of visible light communication transmitters 3 at the same time, the plurality of light signals interfere each other. Thus, visible light communication receiver 2 cannot demodulate the light signals properly or extract information.

Therefore, it is required that only one visible light communication transmitter 3 is located in the range of directional angle α. Since visible light communication receiver 2 and mobile object 4 move together, smaller directional angle α makes it less likely to receive the plurality of light signals from the plurality of visible light communication transmitters 3.

On the other hand, when directional angle α is too small, the period of time for which light signals from one visible light communication transmitter 3 can be received becomes short. Thus, light signals sufficient for demodulating predetermined information cannot be received. Thus, in order to receive light signals from one visible light communication transmitter 3 for a long period of time, directional angle α is preferably large.

As described above, light signals interfere each other when directional angle α is too large; however, information from visible light communication transmitter 3 cannot be obtained when directional angle α is too small. Therefore, directional angle α is set to such a value that extends, as much as possible, the period of time for which visible light communication receiver 2 can receive, while moving, the light signals without interference.

Specifically, directional angle α is set to such a value that shortens as much as possible or eliminates the period of time for which light signals are overlappingly received from a plurality of visible light communication transmitters 3 and the period of time for which no light signal is received. For example, it is sufficient as long as the range of directional angle α matches the spacing between two adjacent visible light communication transmitters 3.

Described here is the case where the plurality of visible light communication transmitters 3 are tunnel illuminating lamps. The tunnel illuminating lamps (visible light communication transmitters 3) are consecutively disposed at certain spacing d [m]. The following equations are to be satisfied in order for the range of directional angle α and spacing d to match each other:

$$\tan(\alpha/2) = d/2h \quad \text{(Equation 1)}$$

that is, $$\alpha = 2\tan^{-1}(d/2h) \quad \text{(Equation 2)}$$

where h [m] is the distance between light receiving surface 11 of light receiving device 10 of visible light communication receiver 2 and visible light communication transmitter 3.

For example, directional angle α is about 21.2° when d=1.5 [m] and h=4 [m]. That is to say, directional angle α is about ±10.6°. Furthermore, directional angle α is about 34.5° when d=2.5 and h=4, for example. That is to say, directional angle α is about ±17° in this case.

It is to be noted that spacing d between the tunnel illuminating lamps (visible light communication transmitters 3) differs for each tunnel. Furthermore, spacing d differs for each country based on the laws and regulations of the country in which the tunnel is built. Moreover, distance h between light receiving surface 11 and each visible light communication transmitter 3 differs depending on the position in mobile object 4 at which visible light communication receiver 2 is attached. For example, distance h differs depending on whether mobile object 4 is a sedan or a truck, or depending on whether visible light communication receiver 2 is attached on the dashboard or at the upper portion of the windshield. Accordingly, smaller directional angle α makes it easier to satisfy the condition of (Equation 2), and the versatility of visible light communication receiver 2 can be thus increased.

Directional Characteristics on the Second Plane (Lateral Direction)

Figure 7:
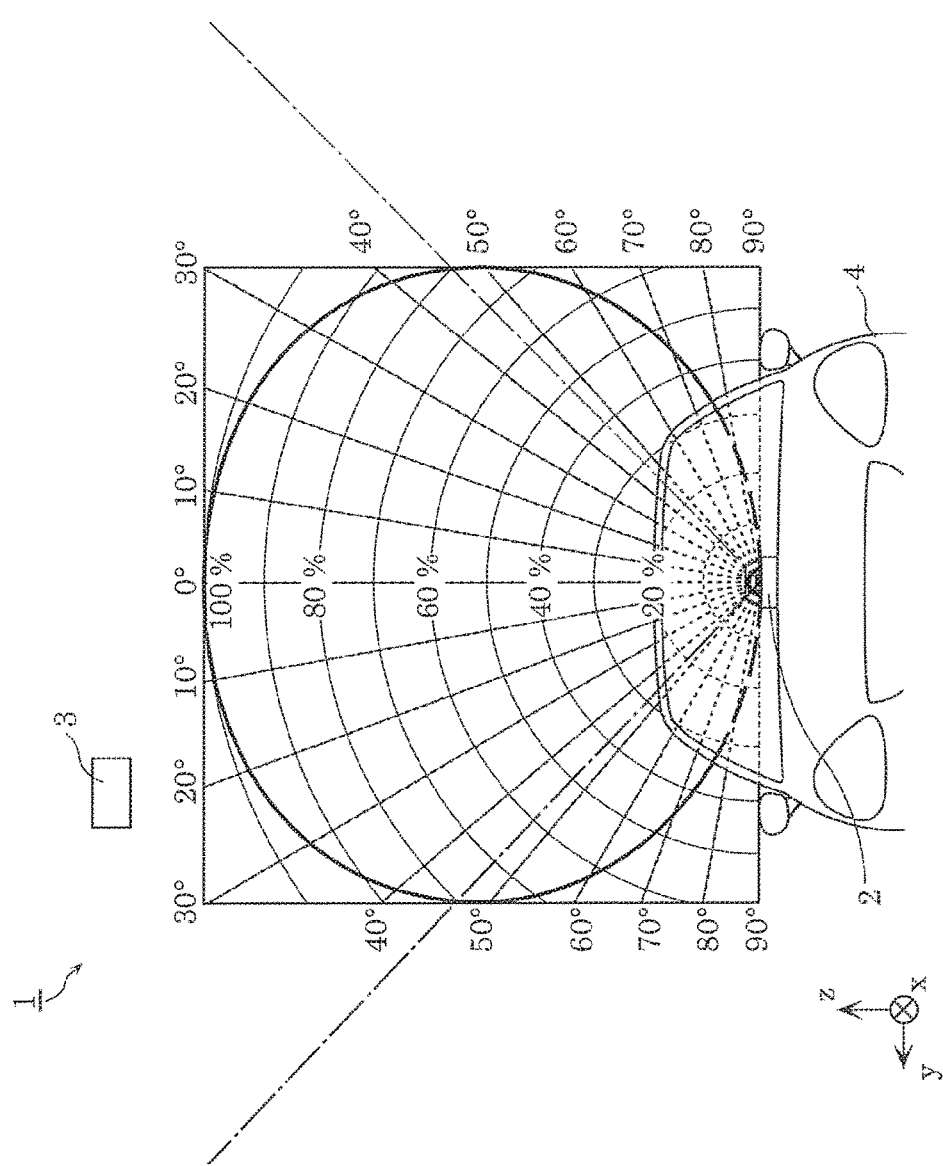
FIG. 7 is a diagram schematically illustrating the position of a visible light communication receiver and the directional characteristics of a lens component in a front view of a mobile object according to Embodiment 1.

As illustrated in FIG. 7, since directional angle β on the plane (for example, yz plane) orthogonal to the direction of travel of mobile object 4 (the negative side of the x-axis direction) is wide, it is possible to receive light signals from a wide range on the yz plane.

The wider the directional angle is, the wider the range in which light signals can be received is. In the direction of travel, directional angle α is set smaller due to the problematic interference of light signals as described by reference to FIG. 6. In the lateral direction of mobile object 4 (yz plane), however, the plurality of visible light communication transmitters 3 are seldom disposed at narrow spacings. For this reason, directional angle β on the yz plane can be set wide.

Figure 8:
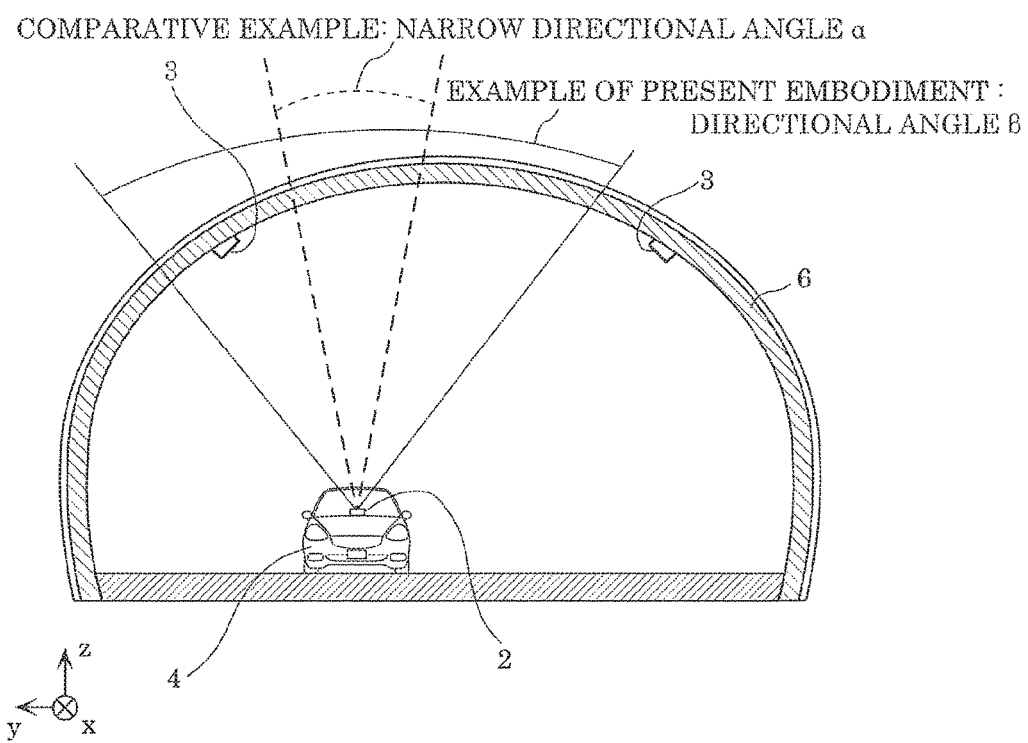
FIG. 8 is a cross-sectional view of a tunnel for illustrating an advantageous effect obtained by applying a visible light communication system according to Embodiment 1 to the tunnel.

FIG. 8 is a cross-sectional view of tunnel 6 for illustrating an advantageous effect obtained by applying visible light communication system 1 according to the present embodiment to tunnel 6. Specifically, FIG. 8 illustrates the cross section (yz cross section) orthogonal to the direction of travel of mobile object 4. In FIG. 8, the case where the directional angle is β is illustrated as an example of the present embodiment and the case where the directional angle is α is illustrated as a comparative example.

In tunnel 6 illustrated in FIG. 8, two visible light communication transmitters 3 (tunnel illuminating lamps) are disposed off the center in the lateral direction. If mobile object 4 includes visible light communication receiver 2 having narrow directional angle α on the yz plane as illustrated in the comparative example, light signals cannot be received from any of two visible light communication transmitters 3.

When the directional angle on the yz plane is narrow as described above, there could be a case where light signals cannot be received depending on the positions of visible light communication transmitters 3 in tunnel 6 and the position in tunnel 6 where mobile object 4 travels, for example.

In contrast, if mobile object 4 includes visible light communication receiver 2 having wide directional angle β in the yz plane as illustrated in the example of the present embodiment, light signals can be received from one of two visible light communication transmitters 3.

Advantageous Effects, Etc.

As described above, visible light communication receiver 2 according to the present embodiment is a visible light communication receiver to be attached to mobile object 4 and includes: light receiving device 10 which receives a light signal for visible light communication, the light signal including predetermined information; and lens component 20 disposed over light receiving device 10, wherein lens component 20 has directional angle α on a first plane and directional angle β on a second plane orthogonal to the first plane, and directional angle α is narrower than directional angle β.

Since directional angle α on the first plane is narrow as described above, when a plurality of visible light communication transmitters 3 are disposed on the first plane, it is possible to reduce the impact of the interference area of light signals emitted by each of the plurality of visible light communication transmitters 3. Furthermore, since directional angle β is wide on the second plane, it is possible to receive light signals from a wide range on the second plane. In other words, there is a higher degree of flexibility in the positions of visible light communication transmitters 3 on the second plane. In such a manner as described above, visible light communication receiver 2 can reduce the impact of the interference area and receive appropriate light signals.

For example, visible light communication receiver 2 is attached to mobile object 4 in a manner that the first plane is substantially parallel to the direction of travel of mobile object 4.

With this, as in the case of tunnel 6, for example, when a plurality of visible light communication transmitters 3 (tunnel illuminating lamps) are disposed along the direction of travel of mobile object 4, directional angle α is narrow in the direction of travel. Thus, visible light communication receiver 2 can reduce the impact of the interference area of light signals emitted from each of the plurality of visible light communication transmitters 3.

Furthermore, for example, mobile object 4 includes window 120 which is light-transmissive, visible light communication receiver 2 is attached to the interior of mobile object 4, and light receiving device 10 receives the light signal which enters via window 120.

In the case of attaching visible light communication receiver 2 to the exterior of mobile object 4, treatment such as waterproof treatment is necessary as visible light communication receiver 2 may be exposed to the elements, for example. In contrast, since visible light communication receiver 2 is attached to the interior of mobile object 4, the configuration can be simplified as compared to the case of attaching visible light communication receiver 2 to the exterior of mobile object 4.

Furthermore, when viewed in the direction parallel to the first plane and the second plane (the z-axis direction), lens component 20 has a substantially rectangular shape elongated in the normal direction of the first plane, for example.

As described above, since the directional characteristics are achieved by the shape of lens component 20, visible light communication receiver 2 can be implemented with a simple configuration. The simple configuration leads to reduction in the cost of visible light communication receiver 2, which promotes installation of visible light communication receiver 2 to a greater number of mobile objects 4, for example. With a greater number of mobile objects 4 including visible light communication receiver 2, mobile objects 4 can travel based on environmental information such as congestion information, and thus smoother traffic can be achieved, for example.

Furthermore, mobile object 4 according to the present embodiment is a mobile object including visible light communication receiver 2.

As described above, since mobile object 4 includes visible light communication receiver 2, it is possible to reduce the impact of the interference area and receive appropriate light signals. With this, by presenting the information obtained through visible light communication to the driver or operator of mobile object 4, the information can be used for the traveling or operation (driving) of mobile object 4, for example. Accordingly, by presenting environmental information such as congestion information, the operation of mobile object 4 can be supported and smoother traffic can be achieved, for example.

Furthermore, visible light communication system 1 according to the present embodiment includes visible light communication receiver 2 and visible light communication transmitter 3 which transmits a light signal for visible light communication.

As described above, since visible light communication system 1 includes visible light communication receiver 2, it is possible to reduce the impact of the interference area and receive appropriate light signals. With this, by presenting the information obtained through visible light communication to the driver or operator of mobile object 4, the information can be used for the traveling or operation (driving) of mobile object 4, for example. Accordingly, by presenting environmental information such as congestion information, the operation of mobile object 4 can be supported and smoother traffic can be achieved, for example.

Furthermore, visible light communication transmitter 3 is either one of a tunnel illuminating lamp and a street light, for example.

With this, when using visible light communication in tunnel 6, the position of mobile object 4 can be determined, for example. For example, outdoors, the position of mobile object 4 has conventionally been determined by Global Positioning System (GPS) for purposes such as navigation. In a place such as tunnel 6, however, radio waves from the GPS satellite cannot be received, and thus the position cannot be determined using GPS.

In contrast, use of visible light communication enables determination of the position of mobile object 4 even when GPS cannot be used, thus allowing appropriate navigation and so on.

Variation 1

Next, Variation 1 of visible light communication receiver 2 according to the present embodiment will be described by reference to the drawings.

Figure 9:
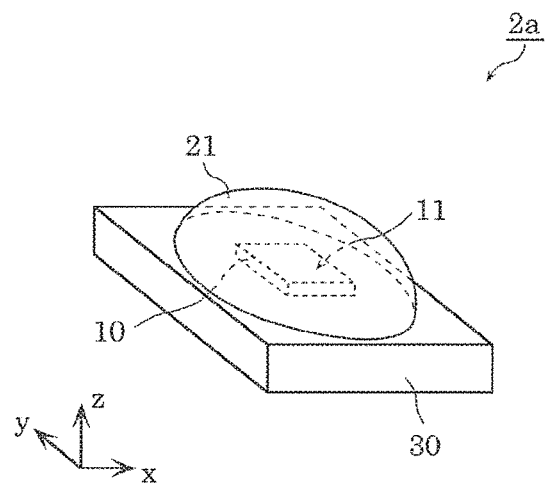
FIG. 9 is a perspective bird's eye view of a visible light communication receiver according to Variation 1 of Embodiment 1.
Figure 10:
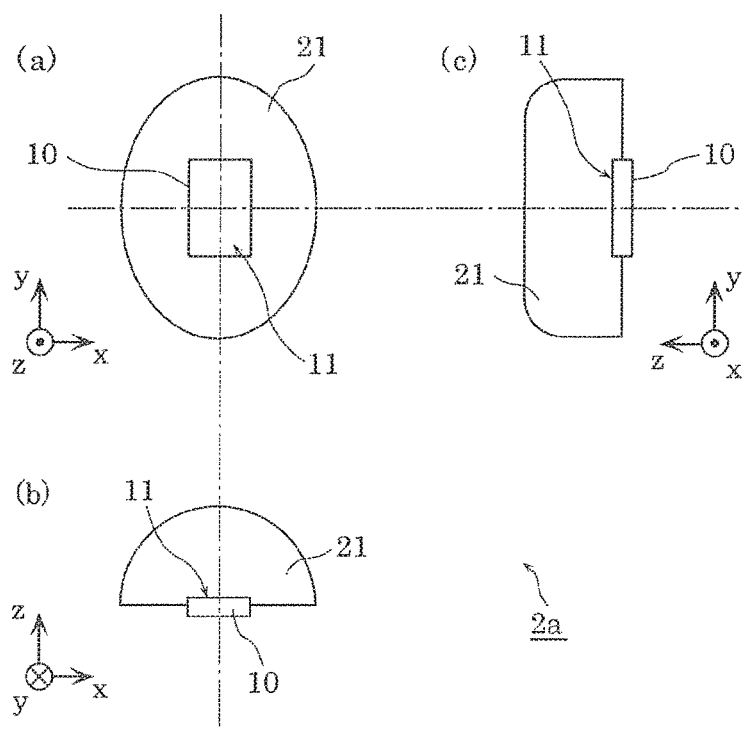
FIG. 10 illustrates three orthogonal views of a visible light communication receiver according to Variation 1 of Embodiment 1.

FIG. 9 illustrates a perspective bird's eye view of visible light communication receiver 2a according to the present variation, and FIG. 10 illustrates three orthogonal views of visible light communication receiver 2a according to the present variation. Specifically, (a), (b), and (c) of FIG. 10 are a plan view (top view), a front view, and a side view (right side view) of visible light communication receiver 2a, respectively. It is to be noted that housing 30 is not illustrated in FIG. 10 to facilitate understanding of the positional relationship between light receiving device 10 and lens component 21 of visible light communication receiver 2a and the shape of lens component 21.

As compared to visible light communication receiver 2 illustrated in FIG. 2 and FIG. 3, visible light communication receiver 2a according to the present variation is different in having lens component 21 instead of lens component 20. Specifically, in the present variation, the shape of lens component 21 is different from the shape of lens component 20. The other aspects are the same as those of the above embodiment.

Lens component 21 has a substantially semi-ellipsoidal shape as illustrated in FIG. 9. Specifically, when viewed in the direction parallel to the first plane and the second plane (yz plane), lens component 21 has a substantially elliptical shape elongated in the normal direction (the y-axis direction) of the first plane (xz plane). Specifically, as illustrated in (a) of FIG. 10, lens component 21 in plan view has a substantially elliptical shape having the longer axis parallel to the y-axis direction and the shorter axis parallel to the x-axis direction.

As illustrated in (b) and (c) of FIG. 10, the shape of lens component 21 in front view and side view is substantially the same as that of lens component 20 (see (b) and (c) of FIG. 3).

The directional characteristics of lens component 21 according to the present variation are substantially the same as the directional characteristics of lens component 20 (specifically, the directional characteristics illustrated in FIG. 4 and FIG. 5). That is to say, lens component 21 has directional angle α on the first plane (xz plane) and directional angle β on the second plane (yz plane), and directional angle α is narrower than directional angle β.

With visible light communication receiver 2a according to the present variation described above, when viewed in the direction (the z-axis direction) parallel to the first plane and the second plane, lens component 21 has a substantially elliptical shape elongated in the normal direction of the first plane.

This makes it possible to reduce the impact of the interference area and receive appropriate light signals. In addition, since the directional characteristics are achieved using the shape of lens component 21, visible light communication receiver 2a can be implemented with a simple configuration.

Variation 2

Next, Variation 2 of visible light communication receiver 2 according to the present embodiment will be described by reference to the drawings.

Figure 11:
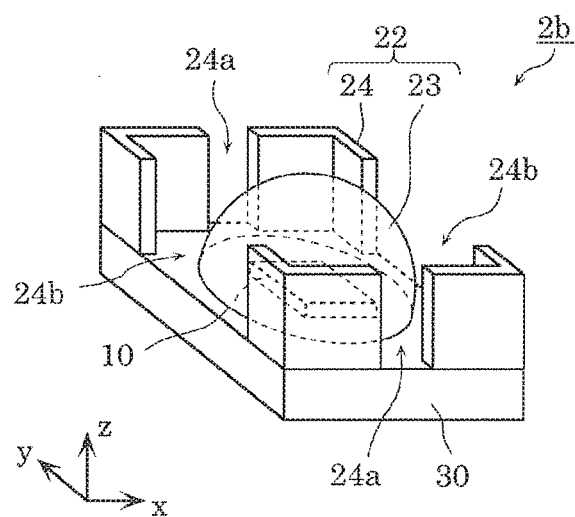
FIG. 11 is a perspective bird's eye view of a visible light communication receiver according to Variation 2 of Embodiment 1.
Figure 12:
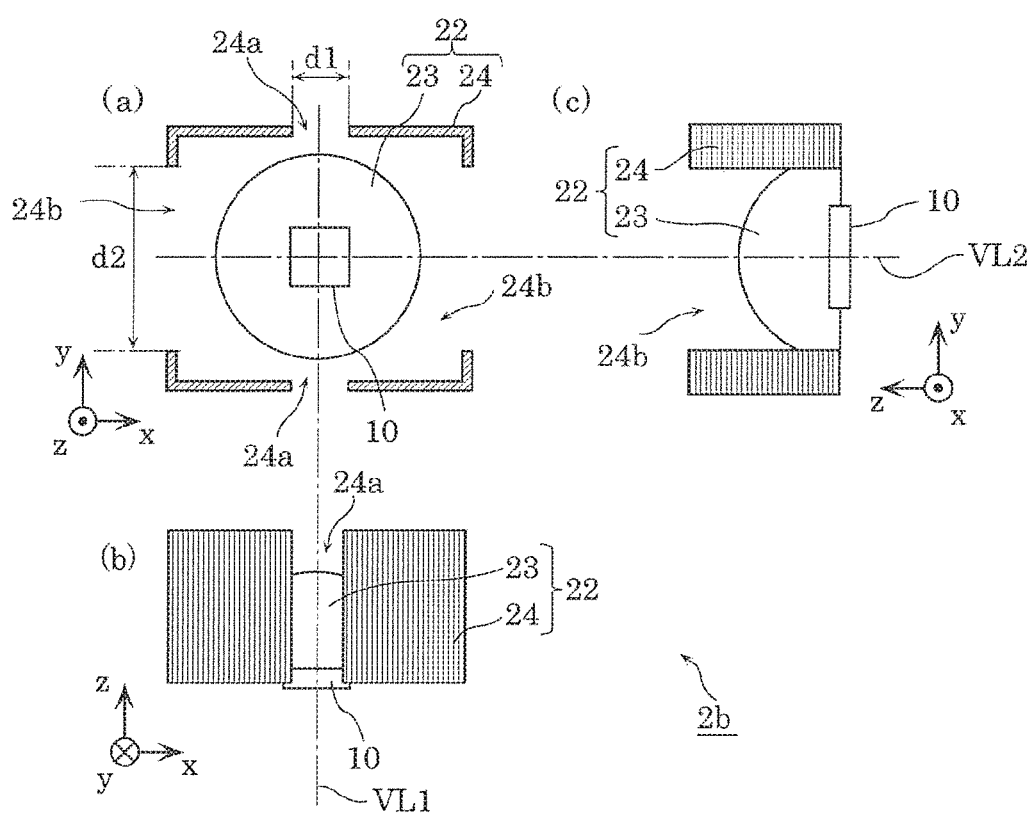
FIG. 12 illustrates three orthogonal views of a visible light communication receiver according to Variation 2 of Embodiment 1.

FIG. 11 illustrates a perspective bird's eye view of visible light communication receiver 2b according to the present variation, and FIG. 12 illustrates three orthogonal views of visible light communication receiver 2b according to the present variation. Specifically, (a), (b), and (c) of FIG. 12 are a plan view (top view), a front view, and a side view (right side view) of visible light communication receiver 2b, respectively. It is to be noted that housing 30 is not illustrated in FIG. 12 to facilitate understanding of the positional relationship between light receiving device 10 and lens component 22 of visible light communication receiver 2b and the shape of lens component 22.

As compared to visible light communication receiver 2 illustrated in FIG. 2 and FIG. 3, visible light communication receiver 2b according to the present variation is different in having lens component 22 instead of lens component 20. As illustrated in FIG. 11, lens component 22 includes lens 23 and light-shielding wall 24.

Lens 23 is an omnidirectional lens. In the present variation, an omnidirectional lens means that the lens has almost no directivity on the xy plane parallel to light receiving surface 11 of light receiving device 10. In other words, light which enters light receiving surface 11 via lens 23 from the positive side of the z-axis direction is received in a substantially even manner.

For example, lens 23 has directional characteristics of directional angle β illustrated in FIG. 5 in substantially all the planes orthogonal to the xy plane. That is to say, the directional characteristics of lens 23 on the xz plane and the directional characteristics of lens 23 on the yz plane are the directional characteristics of directional angle β illustrated in FIG. 5.

It is to be noted that the directional characteristics of lens 23 are exemplary and are not particularly limited. For instance, lens 23 may be a directional lens; lens 23 may have, like lens component 20 or lens component 21, a substantially semicircular cylindrical shape or a semi-ellipsoidal shape elongated in the y-axis direction, for example.

Lens 23 is formed from, for example, a light-transmissive resin material such as acrylic or polycarbonate. For example, lens 23 is formed by injection molding using a light-transmissive resin material.

Light-shielding wall 24 surrounds lens 23. As illustrated in FIG. 11 and FIG. 12, light-shielding wall 24 includes first slits 24a and second slits 24b.

Light-shielding wall 24 is disposed like a loop in plan view, to surround lens 23. The shape of light-shielding wall 24 in plan view is a rectangular loop, but may be a circular loop or an elliptical loop. Light-shielding wall 24 is disposed to stand vertically (the positive side of the z-axis direction) on the top surface of housing 30.

Light-shielding wall 24 has the property of shielding visible light. For example, light-shielding wall 24 transmits almost no visible light by absorbing or reflecting visible light. Light-shielding wall 24 is formed from a resin material such as PBT, for example.

Each of first slits 24a is disposed at a position intersecting with first virtual line VL1 which is substantially parallel to the normal direction (the y-axis direction) of the first plane (xz plane) and passes through light receiving device 10 in plan view. In the present variation, each of two first slits 24a is disposed at an intersection of light-shielding wall 24 and first virtual line VL1. Two first slits 24a have the same shape, and first virtual line VL1 passes through the approximate middle of two first slits 24a. Each first slit 24a is a slit having a substantially rectangular shape in front view as illustrated in (b) of FIG. 12.

Each of second slits 24b is disposed at a position intersecting with second virtual line VL2 which is substantially parallel to the normal direction (the x-axis direction) of the second plane (yz plane) and passes through light receiving device 10 in plan view. In the present variation, each of two second slits 24b is disposed at an intersection of light-shielding wall 24 and second virtual line VL2. Two second slits 24b have the same shape, and second virtual line VL2 passes through the approximate middle of two second slits 24b. Each second slit 24b is a slit having a substantially rectangular shape in front view as illustrated in (c) of FIG. 12.

As illustrated in (a) of FIG. 12, second slits 24b have a slit width larger than the slit width of first slits 24a. That is to say, slit width d2 of second slits 24b is larger than slit width d1 of first slits 24a.

This renders the directional characteristics of lens component 22 according to the present variation substantially the same as the directional characteristics of lens component 20 according to the present embodiment (specifically, the directional characteristics illustrated in FIG. 4 and FIG. 5). That is to say, directional angle α of lens component 22 on the first plane (xz plane) is narrower than directional angle β of lens component 22 on the second plane (yz plane).

It is to be noted that smaller slit width d1 of first slits 24a can make directional angle α smaller. Larger slit width d2 of second slits 24b can make directional angle β larger. That is to say, with visible light communication receiver 2b according to the present variation, the directional characteristics can be easily changed by adjusting the slit widths of the slits disposed in light-shielding wall 24.

As described above, with visible light communication receiver 2b according to the present variation, lens component 22 includes lens 23 which is omnidirectional and light-shielding wall 24 surrounding lens 23. Light-shielding wall 24 includes: first slit 24a disposed at a position intersecting with first virtual line VL1 which is substantially parallel to the normal direction of the first plane and passes through light receiving device 10 in plan view; and second slit 24b disposed at a position intersecting with second virtual line VL2 which is substantially parallel to the normal direction of the second plane and passes through light receiving device 10 in plan view. Second slit 24b has a slit width larger than a slit width of first slit 24a.

This makes it possible to reduce the impact of the interference area and receive appropriate light signals. In addition, since the directional characteristics are achieved using the shape of light-shielding wall 24, visible light communication receiver 2b can be implemented with a simple configuration.

Variation 3

Next, Variation 3 of visible light communication receiver 2 according to the present embodiment will be described by reference to the drawings.

Each of Embodiment 1 and Variations 1 and 2 described above has illustrated the example in which the directional characteristics are invariant and determined according to the shapes of lens components 20, 21, and 22. In contrast, with the visible light communication receiver according to the present variation, the directional characteristics of the lens component are variable based on a predetermined condition.

Specifically, the predetermined condition is determined according to information based on the states of mobile object 4 and visible light communication transmitter 3. Hereinafter, the case of changing the directional characteristics of lens component 22 according to Variation 2 will be described for each predetermined condition.

Velocity of Mobile Object

As an example of one condition, at least one of the directional angles of lens component 22 may be changed according to the velocity of mobile object 4. That is to say, at least one of the directional angles of lens component 22 may be variable according to the velocity of mobile object 4.

For example, visible light communication receiver 2b according to the present variation includes a slide mechanism (not illustrated) which moves light-shielding wall 24. The slide mechanism is an actuator or the like and is connected to controller 40, for example. Controller 40 drives the actuator based on velocity information obtained from in-vehicle terminal 5, so as to move light-shielding wall 24.

In-vehicle terminal 5 obtains velocity information indicating the moving velocity of mobile object 4. For example, controller 112 obtains the velocity information from the speedometer of mobile object 4. Communication circuit 111 transmits the obtained velocity information to visible light communication receiver 2.

Figure 13:
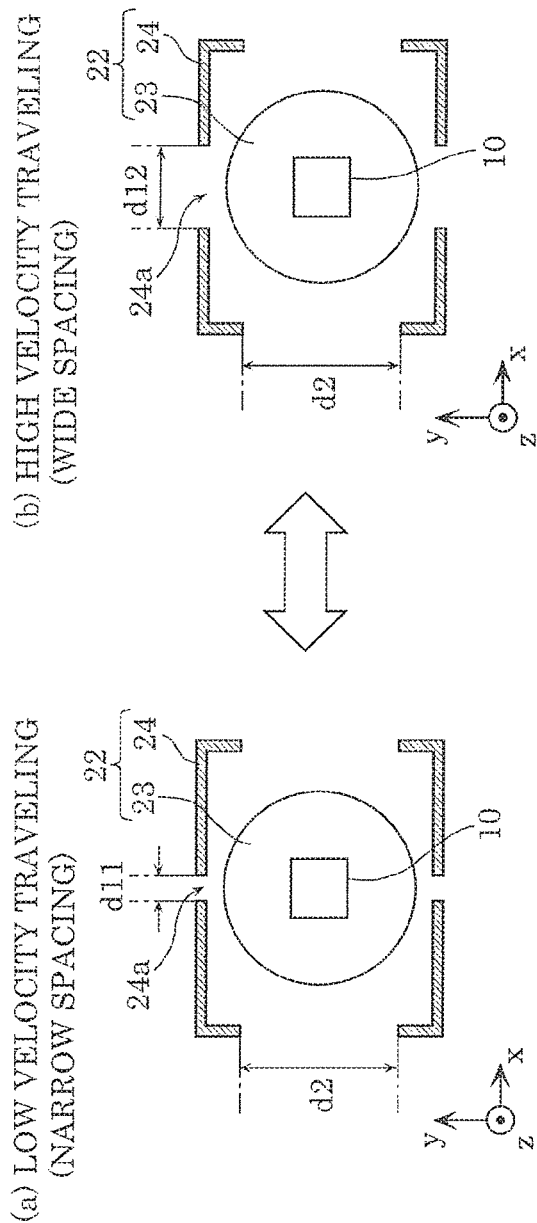
FIG. 13 is a plan view illustrating the shape of a lens component determined according to the velocity of a mobile object or the spacing between visible light communication transmitters according to Variation 3 of Embodiment 1.

FIG. 13 is a plan view illustrating the shape of lens component 22 determined according to the velocity of mobile object 4 or the spacing between visible light communication transmitters 3 according to the present variation.

In the present variation, for example, the slit width of first slits 24a is decreased when the velocity of mobile object 4 is low, whereas the slit width of first slits 24a is increased when the velocity of mobile object 4 is high. That is to say, as illustrated in FIG. 13, slit width d11 of first slits 24a when mobile object 4 is traveling at low velocity is smaller than slit width d12 of first slits 24a when mobile object 4 is traveling at high velocity.

In such a manner as described above, the slit width of first slits 24a may be increased with increase in the velocity of mobile object 4, and decreased with decrease in the velocity of mobile object 4. The slit width may be variable in a continuous manner or a stepwise (discrete) manner. It is to be noted that slit width d12 of first slits 24a is smaller than or equal to slit width d1 according to Variation 2.

As described earlier, the slit width of first slits 24a has a positive correlation with directional angle α on the first plane (xz plane) of lens component 22. Therefore, according to the present variation, directional angle α decreases as the velocity of mobile object 4 decreases, and directional angle α increases as the velocity of mobile object 4 increases.

This makes it possible to reduce the impact of the interference area and receive appropriate light signals. For example, since the period of time for which light can be received from one visible light communication transmitter 3 increases when mobile object 4 is traveling at low velocity, light signals can be received appropriately even when directional angle α is small. Because directional angle α is small, the impact of the interference area can be reduced.

On the other hand, since the period of time for which light can be received from one visible light communication transmitter 3 decreases when mobile object 4 is traveling at high velocity, an increase in directional angle α can increase the period of time for which light can be received. As a result, light signals can be appropriately received.

Spacing Between Visible Light Communication Transmitters

As another example of one condition, at least one of the directional angles of lens component 22 may be changed according to the spacing between visible light communication transmitters 3. That is to say, at least one of the directional angles of lens component 22 may be variable according to the spacing between a plurality of visible light communication transmitters 3 each of which emits a light signal.

For example, in-vehicle terminal 5 obtains the spacing between visible light communication transmitters 3. For example, controller 112 of in-vehicle terminal 5 obtains the spacing based on an image in the direction of travel of mobile object 4 captured by the camera of the event data recorder provided in mobile object 4.

For example, the slit width of first slits 24a is decreased when the spacing between visible light communication transmitters 3 is narrow, whereas the slit width of first slits 24a is increased when the spacing between visible light communication transmitters 3 is wide. That is to say, as illustrated in FIG. 13, slit width d11 of first slits 24a when visible light communication transmitters 3 are narrowly spaced is smaller than slit width d12 of first slits 24a when visible light communication transmitters 3 are widely spaced.

This makes it possible to reduce the impact of the interference area and receive appropriate light signals. Wide spacing means that the range in which light signals can be received without interference is wide, and thus an increase in directional angle $\alpha$ enables appropriate reception of light signals. On the other hand, narrow spacing means that the range in which light signals can be received without interference is narrow, and thus a decrease in directional angle $\alpha$ enables reduction of the impact of the interference area.

It is to be noted that although the present variation has illustrated the example in which the directional characteristics of lens component 22 are variable, the present disclosure is not limited to this. For example, the directional characteristics of lens component 20 or lens component 21 may be variable. For example, the shape, refractive index, position, and the like of lens component 20 or lens component 21 may be variable.

Embodiment 2

Next, a visible light communication system according to Embodiment 2 will be described.

The visible light communication system according to the present embodiment is different from that of Embodiment 1 in orientation of visible light communication receiver 2 attached to mobile object 4. Specifically, with the visible light communication system according to the present embodiment, visible light communication receiver 2 is attached to mobile object 4 in a manner that the second plane (yz plane) is substantially parallel to the direction of travel of mobile object 4.

Figure 14:
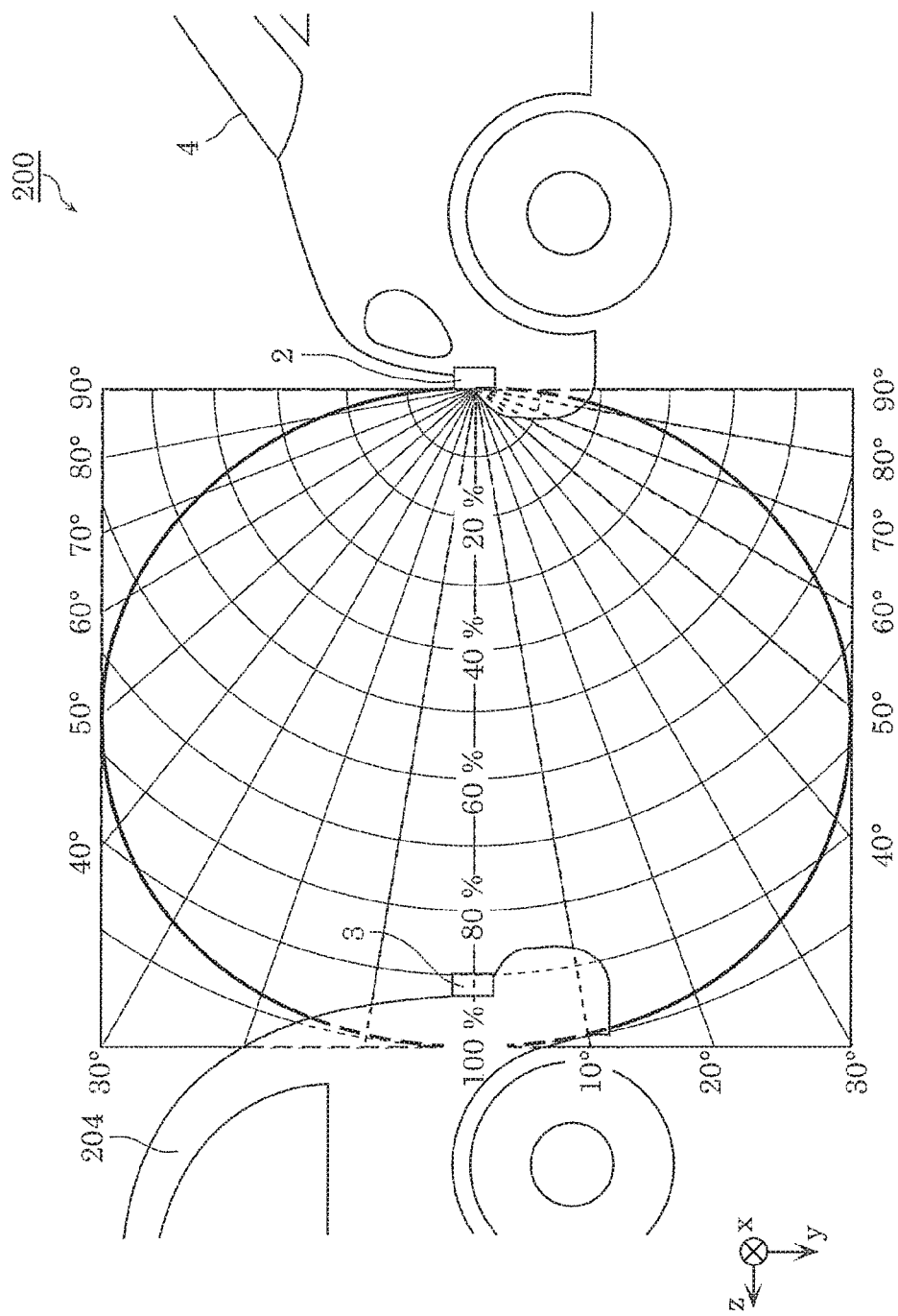
FIG. 14 is a diagram schematically illustrating the position of a visible light communication receiver and the directional characteristics of a lens component in a side view of a mobile object according to Embodiment 2.
Figure 15:
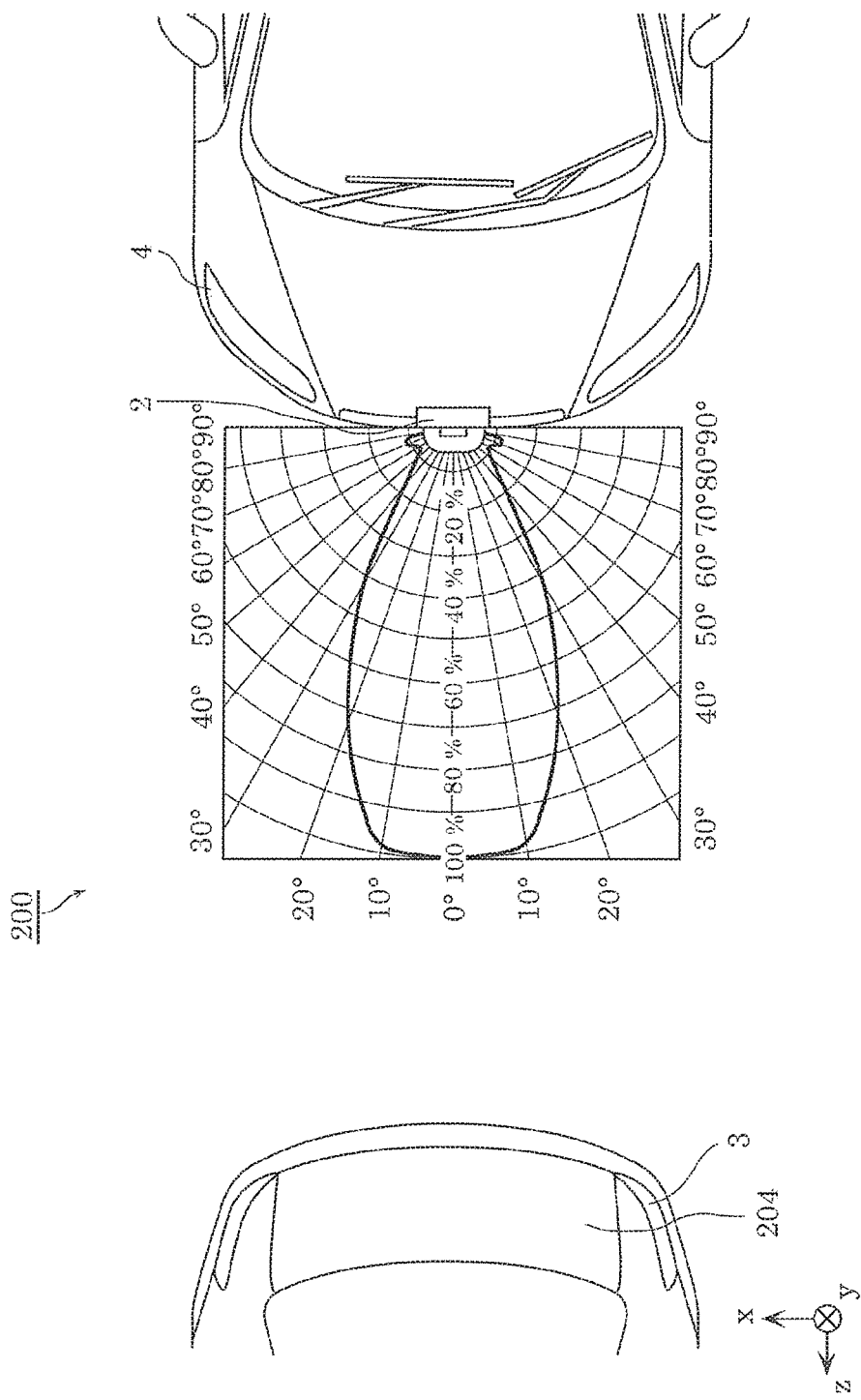
FIG. 15 is a diagram schematically illustrating the position of a visible light communication receiver and the directional characteristics of a lens component in a top view of a mobile object according to Embodiment 2.

FIG. 14 is a diagram schematically illustrating the position of visible light communication receiver 2 and the directional characteristics of lens component 20 in a side view of mobile object 4 according to the present embodiment. FIG. 15 is a diagram schematically illustrating the position of visible light communication receiver 2 and the directional characteristics of lens component 20 in a top view of mobile object 4 according to the present embodiment.

According to the present embodiment, visible light communication receiver 2 is attached to mobile object 4 in a manner that the second plane (yz plane) is substantially parallel to the direction of travel of mobile object 4 (the positive side of the z-axis direction). Specifically, visible light communication receiver 2 is attached to mobile object 4 in a manner that the second plane (yz plane) is substantially orthogonal to the lateral direction of mobile object 4 (the x-axis direction). As illustrated in FIG. 15, visible light communication receiver 2 is attached to mobile object 4 in a manner that the first plane (xz plane) is substantially parallel to the lateral direction of mobile object 4 (the x-axis direction). That is to say, visible light communication receiver 2 is disposed in a manner that the directional angle in the lateral direction of mobile object 4 is narrow whereas the directional angle in the vertical direction and the directional angle in the front-back direction of mobile object 4 are wide.

As illustrated in FIG. 14 and FIG. 15, visible light communication transmitter 3 of visible light communication system 200 according to the present embodiment is disposed in the direction of travel (in front) of mobile object 4. Specifically, visible light communication transmitter 3 is a taillight attached to another mobile object 204. It is to be noted that visible light communication transmitter 3 may be a traffic light.

In this case, there may be a situation where not only mobile object 204 but also many other mobile objects are present in front of mobile object 4. For example, when the road is congested, a plurality of mobile objects 204 are located in front of mobile object 4. Therefore, when the directional angle in the lateral direction of mobile object 4 is wide, there is an interference of light signals from the taillights (visible light communication transmitters 3) of the plurality of other mobile objects 204, and light signals thus cannot be received appropriately.

In contrast, visible light communication receiver 2 according to the present embodiment is attached to mobile object 4 in a manner that the second plane is substantially parallel to the direction of travel of mobile object 4. With visible light communication system 200 according to the present embodiment, visible light communication transmitter 3 is either one of a traffic light and a taillight attached to another mobile object 204.

With this, for example, when a plurality of visible light communication transmitters 3 (taillights or traffic lights) are disposed along the lateral direction of mobile object 4, visible light communication receiver 2 has narrow directional angle $\alpha$ in the lateral direction, and thus it is possible to reduce the impact of the interference area of the light signals emitted from each of the plurality of visible light communication transmitters 3.

On the other hand, because visible light communication receiver 2 has wide directional angle $\beta$ in the vertical direction and the front-back direction, there is, for example, a higher degree of flexibility in the position(s) of visible light communication transmitter(s) 3 located in front of mobile object 4. For example, the position of the taillight (visible light communication transmitter 3) is different depending on whether another mobile object 204 located in front is a sedan or a truck. When visible light communication transmitter 3 is a traffic light, the traffic light is located higher than the taillight. Since visible light communication receiver 2 according to the present embodiment has wide directional angle $\beta$ in the vertical direction and the front-back direction, it is possible to receive light signals without being influenced by the position(s) of visible light communication transmitter(s) 3.

Variation

Next, a variation of visible light communication system 200 according to the present embodiment will be described by reference to the drawings.

Lens component 20 according to the present variation has directional characteristics that are variable as in Variation 3 of Embodiment 1. Specifically, lens component 20 has an orientation direction which is variable according to the steering angle of mobile object 4.

Visible light communication receiver 2 according to the present variation includes a raising and lowering mechanism (not illustrated) which tilts light receiving device 10 and lens component 20, for example. For example, the raising and lowering mechanism lifts one side of the top surface of housing 30 (the surface on which light receiving device 10 is disposed) to tilt light receiving device 10 and lens component 20. The raising and lowering mechanism is an actuator or the like and is connected to controller 40, for example. Controller 40 drives the actuator based on steering angle information obtained from in-vehicle terminal 5, so as to tilt the top surface of housing 30.

In-vehicle terminal 5 obtains steering angle information indicating the steering angle of mobile object 4. For example, controller 112 detects the orientation of the wheels of mobile object 4, the angle of the steering, or the like, to obtain the detection result as the steering angle information. The steering angle information is a numeral value indicating a specific angle, but may simply indicate a direction in which to turn, such as right or left.

Figure 16:
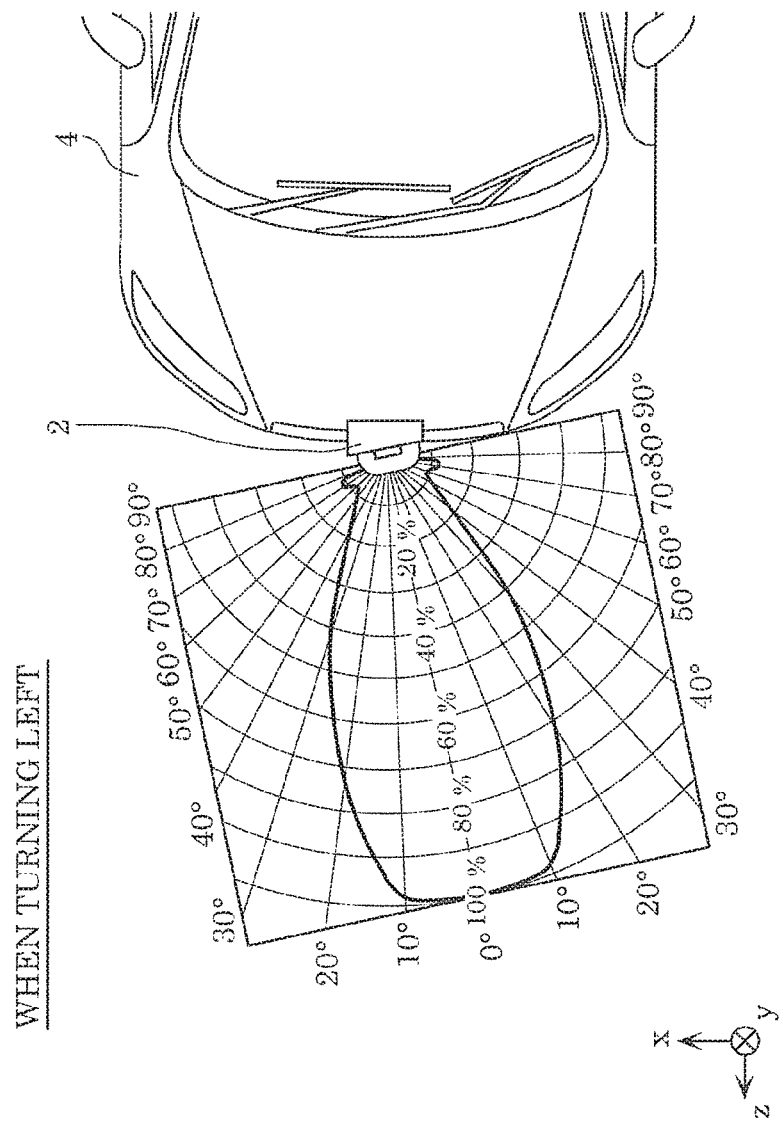
FIG. 16 is a plan view illustrating an orientation direction of a lens component according to the steering angle of a mobile object according to a variation of Embodiment 2.

FIG. 16 is a plan view illustrating an orientation direction of lens component 20 according to the steering angle of mobile object 4 according to the present variation. Specifically, FIG. 16 illustrates the orientation direction of lens component 20 when mobile object 4 turns left.

Assumed here is the case where mobile object 4 performs visible light communication with a traffic light (visible light communication transmitter 3). Through the visible light communication, the traffic light transmits, for example, environmental information indicating a traffic situation or the like in the direction opposite the light emitting direction, that is, in the direction of travel of mobile object 4 which receives light.

For example, in the case where mobile object 4 approaches an intersection, the orientation direction of lens component 20 is tilted to the left as illustrated in FIG. 16 when mobile object 4 turns left. With this, the visible light communication can be performed between mobile object 4 and a traffic light located on the left side before mobile object 4 actually makes the turn. By performing the visible light communication with the traffic light located on the left side, that is, the traffic light located in the direction in which mobile object 4 is to proceed, it is possible to obtain information indicating a traffic situation or the like in the direction in which mobile object 4 is to proceed. Accordingly, by presenting environmental information such as congestion information, the operation of mobile object 4 can be supported and smoother traffic can be achieved, for example.

Others

Although a visible light communication receiver, a mobile object, and a visible light communication system according to the present disclosure have been described above based on the above embodiments and variations thereof, the present disclosure is not limited to the above embodiments and variations thereof.

For example, although Embodiment 1 has illustrated the example in which the second plane (yz plane) is orthogonal to the direction of travel of mobile object 4, the present disclosure is not limited to this. For example, the second plane (yz plane) may be tilted in the direction of travel of mobile object 4. That is to say, light signals may be received from visible light communication transmitter 3 located in the direction of travel (in front) of mobile object 4 instead of directly above mobile object 4.

Furthermore, for example, although Embodiment 2 has illustrated the example in which the second plane (yz plane) is parallel to the direction of travel of mobile object 4, the present disclosure is not limited to this. For example, the second plane (yz plane) may be tilted to the left or right from the direction of travel of mobile object 4.

Each structural element in each embodiment described above may be implemented as dedicated hardware or implemented by running a software program suitable for the structural element. Each structural element may be implemented by a program execution unit such as a Central Processing Unit (CPU) or a processor reading and running a software program recorded on a recording medium such as a hard disk or a semiconductor memory.

It is to be noted that the present disclosure can be implemented not only as a visible light communication receiver or a visible light communication system but also as a program including as steps the processing performed by each structural element of the visible light communication receiver or the visible light communication system and a computer-readable recording medium such as a digital versatile disc (DVD) on which the program is recorded.

That is to say, these general or specific aspects described above may be implemented using a system, an apparatus, an integrated circuit, a computer program, or a computer-readable recording medium, or any combination of systems, apparatuses, integrated circuits, computer programs, and computer-readable recording media.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A visible light communication receiver to be attached to a mobile object that is a vehicle in which an in-vehicle terminal is provided, the visible light communication receiver comprising:
    a light receiving device which receives a light signal for visible light communication, the light signal including predetermined information;
    a lens component disposed over the light receiving device;
    a control circuit which extracts the predetermined information from the light signal received by the light receiving device; and
    a communication circuit which is connected to the in-vehicle terminal and transmits the predetermined information extracted by the control circuit to the in-vehicle terminal,
    wherein the lens component has a first directional angle on a first plane and a second directional angle on a second plane orthogonal to the first plane, the first directional angle being narrower than the second directional angle.

2. The visible light communication receiver according to claim 1,
    wherein the visible light communication receiver is attached to the mobile object in a manner that the first plane is substantially parallel to a direction of travel of the mobile object.

3. The visible light communication receiver according to claim 1,
    wherein the visible light communication receiver is attached to the mobile object in a manner that the second plane is substantially parallel to a direction of travel of the mobile object.

4. The visible light communication receiver according to claim 1,
wherein at least one of the first directional angle and the second directional angle of the lens component is variable according to a velocity of the mobile object.

5. The visible light communication receiver according to claim 1,
wherein the lens component has an orientation direction which is variable according to a steering angle of the mobile object.

6. The visible light communication receiver according to claim 1,
wherein at least one of the first directional angle and the second directional angle of the lens component is variable according to a spacing between a plurality of visible light communication transmitters each of which emits the light signal.

7. The visible light communication receiver according to claim 1,
wherein the mobile object includes a window which is light-transmissive,
the visible light communication receiver is attached to an interior of the mobile object, and
the light receiving device receives the light signal which enters via the window.

8. The visible light communication receiver according to claim 1,
wherein when viewed in a direction parallel to the first plane and the second plane, the lens component has either one of a substantially rectangular shape and a substantially elliptical shape elongated in a normal direction of the first plane.

9. The visible light communication receiver according to claim 1,
wherein the lens component includes:
a lens which is omnidirectional; and
a light-shielding wall surrounding the lens,
the light-shielding wall includes:
a first slit disposed at a position intersecting with a first virtual line which is substantially parallel to a normal direction of the first plane and passes through the light receiving device in plan view; and
a second slit disposed at a position intersecting with a second virtual line which is substantially parallel to a normal direction of the second plane and passes through the light receiving device in plan view, and
a slit width of the second slit is greater than a slit width of the first slit.

10. A mobile object comprising the visible light communication receiver according to claim 1.

11. A visible light communication system comprising:
the visible light communication receiver according to claim 1; and
a visible light communication transmitter which transmits the light signal for visible light communication.

12. The visible light communication system according to claim 11,
wherein the visible light communication transmitter is either one of a tunnel illuminating lamp and a street light.

13. The visible light communication system according to claim 11,
wherein the visible light communication transmitter is either one of a traffic light and a taillight attached to another mobile object.

14. A visible light communication system, comprising:
a visible light communication receiver to be attached to a vehicle; and
an in-vehicle terminal which is to be provided in the vehicle,
wherein the visible light communication receiver includes:
a light receiving device which receives a light signal for visible light communication, the light signal including predetermined information;
a lens component disposed over the light receiving device;
a control circuit which extracts the predetermined information from the light signal received by the light receiving device; and
a communication circuit which is connected to the in-vehicle terminal and transmits the predetermined information extracted by the control circuit to the in-vehicle terminal, and
the lens component has a first directional angle on a first plane and a second directional angle on a second plane orthogonal to the first plane, the first directional angle being narrower than the second directional angle.

* * * * *